United States Patent [19]

Kato et al.

[11] 4,281,752
[45] Aug. 4, 1981

[54] MECHANICAL CLUTCH RELEASE SYSTEM

[75] Inventors: Hiroshi Kato; Yasuhiro Morita, both of Toyota, Japan

[73] Assignee: Toyota Jidosha Kogyo Kabushiki Kaisha, Toyota, Japan

[21] Appl. No.: 54,651

[22] Filed: Jul. 3, 1979

[30] Foreign Application Priority Data

Mar. 22, 1979 [JP] Japan .............................. 54-37017[U]

[51] Int. Cl.³ ............................................. F16D 23/12
[52] U.S. Cl. .................................. 192/99 R; 180/315
[58] Field of Search ...................... 192/98, 99 R, 99 A, 192/99 B, 99 S; 74/512; 180/315, 336

[56] References Cited

U.S. PATENT DOCUMENTS

| | | | |
|---|---|---|---|
| 3,254,748 | 6/1966 | Smirl | 192/99 S |
| 3,365,042 | 1/1968 | Smirl et al. | 192/111 A |
| 3,429,412 | 2/1969 | Wobrock | 192/111 A |
| 3,788,438 | 1/1974 | Reno | 192/99 S |
| 3,848,479 | 11/1974 | Morris | 192/111 A |
| 3,859,866 | 1/1975 | DeGrazia | 192/111 A |

*Primary Examiner*—George H. Krizmanich
*Attorney, Agent, or Firm*—Oblon, Fisher, Spivak, McClelland & Maier

[57] ABSTRACT

Disclosed herein is a system for releasing a clutch through clutch cables in an automobile having an engine which is connected to a clutch housing containing a clutch release fork and a clutch pedal. The clutch cables comprise an outer cable which is located forwardly of an exhaust pipe of the engine and an inner cable which extends longitudinally through the outer cable. The outer cable is secured to the body of the automobile and to the engine at one end and at the other end respectively, while the inner cable is connected to the clutch pedal and to the clutch release fork at one end outwardly extending from the one end of the outer cable and at the other end outwardly extending from the other end of the outer cable respectively. By virtue of this construction, the outer cable is protected from the high temperature of the exhaust pipe, and there is no relative displacement between the other end of the outer cable and the inner cable when the clutch is not worked.

4 Claims, 3 Drawing Figures

MECHANICAL CLUTCH RELEASE SYSTEM

BACKGROUND OF THE INVENTION

1. Field of the Invention

The present invention relates to a mechanical clutch release system for an automobile, which transmits movement of a clutch pedal to a clutch release fork through clutch cables.

2. Description of the Prior Art

In a conventional clutch release system for an automobile, an outer cable is mounted to a dash panel at one end and to the flange of a clutch housing at the other end, and is arcuately curved between both ends to project forwardly. An inner cable extending longitudinally through the outer cable projects outwardly from both ends of the outer cable to be connected to the clutch pedal at one end and to a clutch release fork at the other end. Since the aforementioned other ends of the outer and inner cables are both immovable with respect to the clutch housing, there is no relative displacement between these ends of the outer and inner cables when the clutch is not worked. In this construction, however, the outer cable passes near the exhaust pipe of the engine and is exposed to the high temperature thereof which is 120° C. and over in general. Consequently, the outer cable made of thermofusible material such as rubber and resin is damaged by the high temperature leading to malfunction of the inner cable.

SUMMARY OF THE INVENTION

The object of the present invention is to provide a mechanical clutch release system which can protect the outer cable from the high temperature of the exhaust pipe while preventing relative displacement of the outer cable and the inner cable connected with the clutch release fork.

DESCRIPTION OF THE PREFERRED EMBODIMENT

Figure 1:
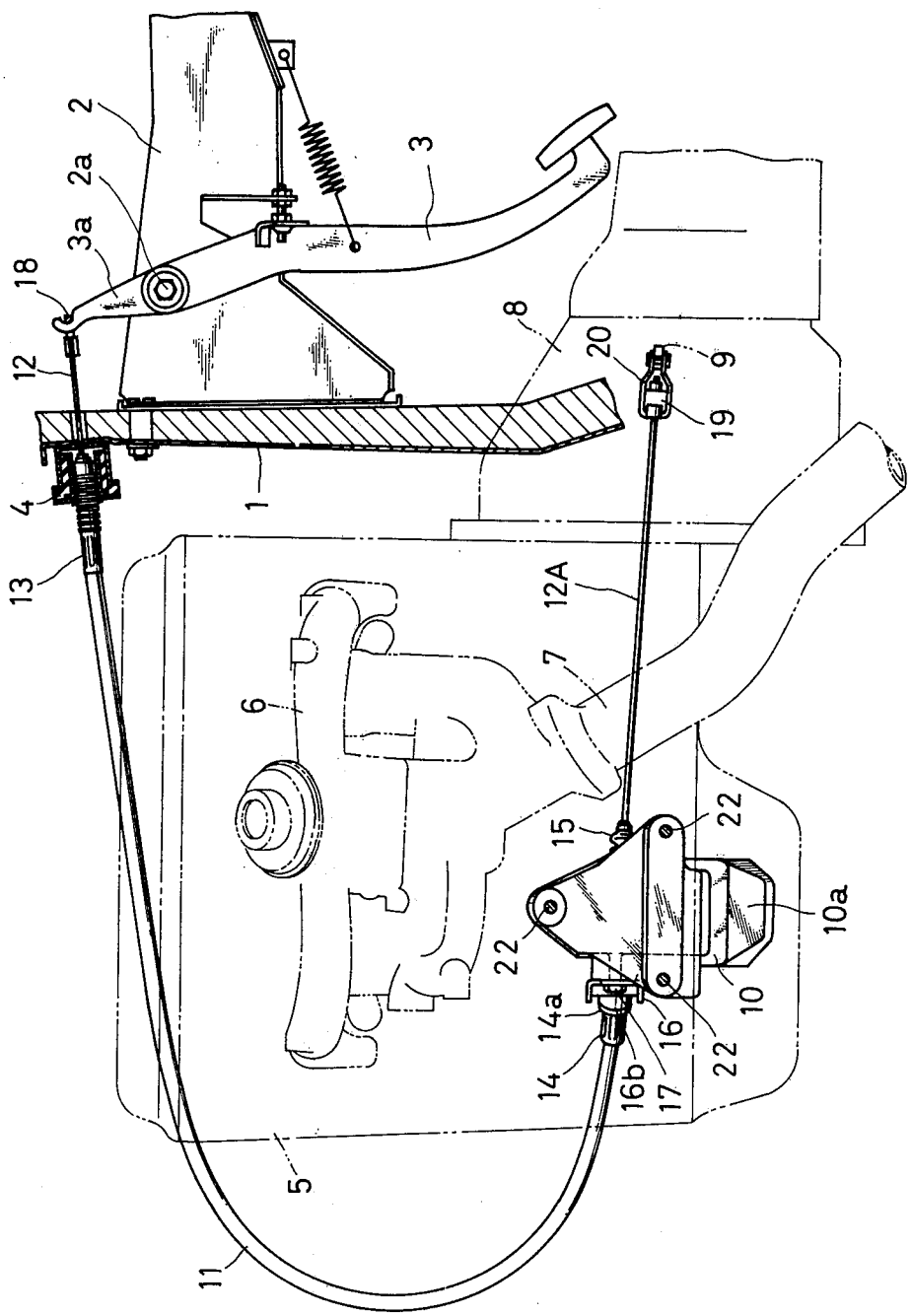
FIG. 1 is a left-side elevational view of the mechanical clutch release system according to the present invention.

Attention is now drawn to FIG. 1 of the drawings, in which a mechanical clutch release system of the present invention is shown. Numeral 1 indicates a dash panel of an automobile to which a pedal bracket 2 is mounted to support a movable clutch pedal 3 through a shaft 2a. Numerals 5 to 9 indicate a cylinder block of an engine, a suction pipe, an exhaust pipe, a clutch housing integrally mounted to the cylinder block 5 and a clutch release fork respectively. The cylinder block 5 is secuted to an engine mounting bracket 21 by a plurality of bolts 22 as is clearly seen from FIGS. 2 and 3, and the engine is supported by a suspension member 23 through the engine mounting bracket 21 and an engine mounting 10 (see FIG. 2). The engine mounting 10 comprises a mounting stabilizer 10a and a lower plate 10b secured to the suspension member 23.

Since the automobile utilized in this embodiment is a right-hand steering type, the clutch pedal 3 is positioned on the left side of the engine and the clutch housing 8 when viewed from the front side of the automobile. Therefore, in FIG. 1 showing the left side elevational view of the system, the engine and the clutch housing 8 are shown in phantom lines for better understanding of the relation between these and clutch cables as hereinafter described.

Movement of the clutch pedal 3 is transmitted to the clutch release fork 9 through an outer cable 11 of elastic material such as rubber and resin and an inner cable 12 extending longitudinally through the outer cable 11 to move along the axis thereof. A pair of cable caps 13 and 14 of, for example, metal are secured to the both ends of the outer cable 11. The cable cap 13 which is near the clutch pedal 3 is mounted to the dash panel 1 through an impact absorbing member 4 of elastic material such as rubber. A hook 18 is secured to the end of the inner cable 12 extending outwardly from the cable cap 13. The hook 18 is engaged with a clutch lever 3a which is integral with the clutch pedal 3 to connect the inner cable 12 with the clutch lever 3a.

Figure 2:
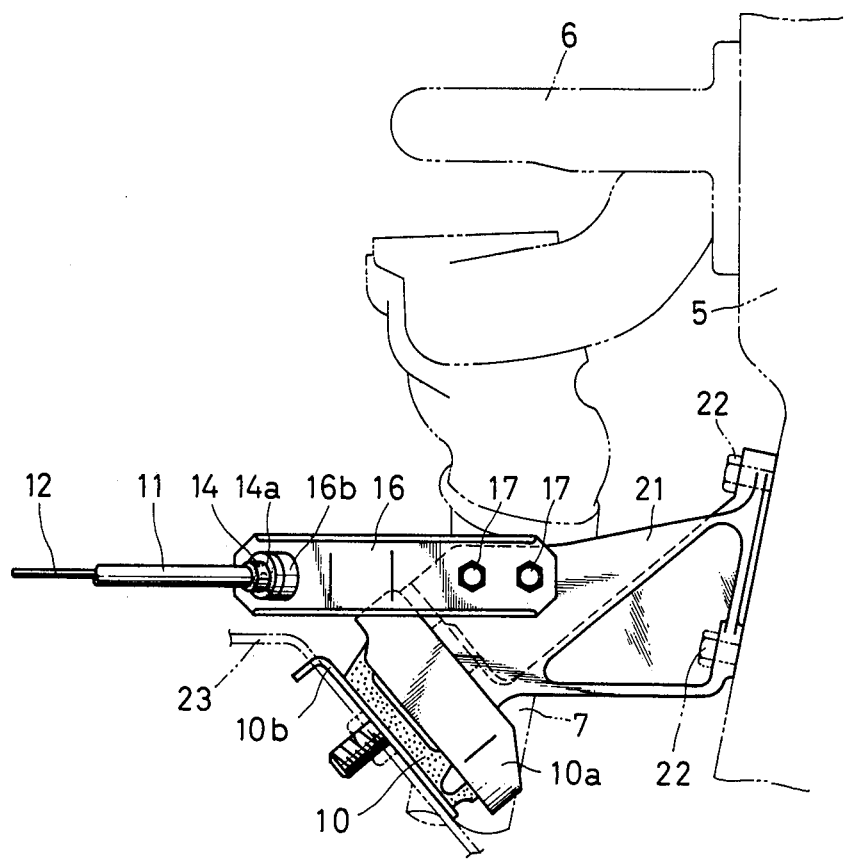
FIG. 2 is a front elevational view of the main components of the mechanical clutch release system as viewed at the left-hand direction of FIG. 1.
Figure 3:
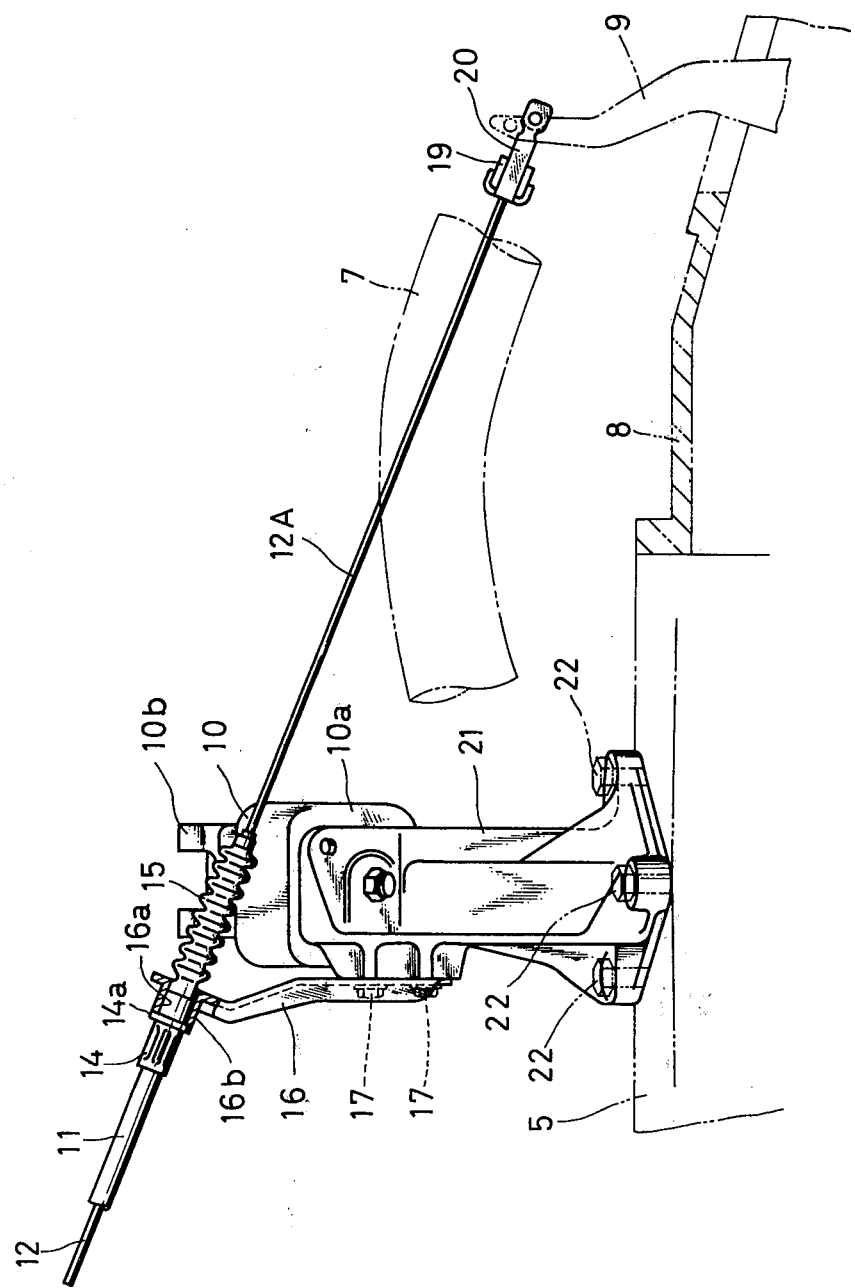
FIG. 3 is a top plan view of the main components as shown in FIG. 2.

A clutch cable bracket 16 is secured to the engine mounting bracket 21 by a pair of bolts 17 (see FIGS. 2 and 3). The clutch cable bracket 16 is located forwardly of the exhaust pipe 7, and projects outwardly from the engine mounting bracket 21, i.e., in the left hand direction in FIG. 2 and in the upper direction in FIG. 3. The bracket 16 has in its forward end a sleeve 16b having a through-hole 16a.

The other cable cap 14 is inserted into the through-hole 16a of the clutch cable bracket 16 so that a flange 14a thereof contacts the end surface of the sleeve 16b to effect proper location of the cable cap 14 with respect to the bracket 16. A dust boot 15 is connected to the cable cap 14, and a clevis 20 is mounted through an impact absorbing member 19 of elastic material such as rubber to the end of the inner cable 12A extending outwardly from the dust boot 15. The clevis 20 is engaged with the clutch release fork 9 projecting from the clutch housing 8 to connect the inner cable 12A with the release fork 9 (see FIG. 3). The engine mounting bracket 21 or the stabilizer 10a of the engine mounting 10 may have an integral projection to substitute for the clutch cable bracket 16.

In this construction, only the inner cable 12A outwardly extending from the outer cable 11 is exposed to the high temperature of the exhaust pipe 7 between the cable cap 14 and the clutch release fork 9. Therefore, the outer cable 11 is protected from the high temperature of the exhaust pipe 7. Further, since the clutch cable bracket 16 is mounted to the engine mounting bracket 21 to which the cylinder block 5 integral with the clutch housing 8 is secured, relative displacement of the outer cable 11 and the inner cable 12A connected with the release fork 9 is effectively avoided.

In the system of the present invention as hereinabove described, the outer cable is effectively protected from the high temperature by virtue of the construction that only the inner cable extending outwardly from the outer cable is exposed to the high temperature to the exhaust pipe, while the clutch cables are maintained curved to prevent relative displacement of the outer cable and the inner cable connected with the clutch release fork.

While the invention has been described with reference to a preferred embodiment thereof, it is to be understood that modifications or variations may be easily made without departing from the scope of this invention which is defined by the appended claims.

What is claimed is:

1. In an automobile having an engine rearwardly connected to a clutch housing containing a clutch release fork therein and a clutch pedal, a system for releasing a clutch through clutch cables, said clutch cables comprising an outer cable comprised of a thermofusible material and being located forwardly of an exhaust pipe of said engine and an inner cable extending longitudinally through said outer cable, said outer cable being secured to the body of said automobile at one end and at the other end to a portion of said engine located forwardly of said exhaust pipe, and said inner cable being connected to said clutch pedal and to said clutch release fork at one end rearwardly extending from said one end of said outer cable and at the other end rearwardly extending from said other end of said outer cable and said exhaust pipe, respectively.

2. The invention as defined in claim 1 wherein said one end of said outer cable is connected to a dash panel provided in said body of said automobile.

3. The invention as defined in claim 1 wherein said other end of said outer cable is connected to a clutch cable bracket mounted to an engine mounting bracket, and a portion of said inner cable extending from said other end of said outer cable is located outwardly of said exhaust pipe of said engine.

4. The invention as defined in claim 1 wherein said outer cable has a frontwardly-projecting curved portion between said ends thereof.

* * * * *